United States Patent [19]
Gasbarro

[11] 3,893,837
[45] July 8, 1975

[54] EQUIPMENT FOR WELDING GLASS CAPILLARY TUBES FOR BIOLOGICAL ANALYSES

[75] Inventor: Luciano Gasbarro, Florence, Italy
[73] Assignee: Pratiga S.r.l., Florence, Italy
[22] Filed: Dec. 21, 1973
[21] Appl. No.: 427,407

[30] Foreign Application Priority Data
Dec. 22, 1972 Italy .................. 9814/72

[52] U.S. Cl. .................. 65/270; 65/34; 65/40; 65/109
[51] Int. Cl. .................. C03b 23/12
[58] Field of Search .......... 65/34, 109, 270, 40, 110

[56] References Cited
UNITED STATES PATENTS
2,622,779  12/1952  Smith et al. .................. 65/110 X
2,987,600  6/1961  Rexford .................. 65/40 X Primary Examiner—Arthur D. Kellogg
Attorney, Agent, or Firm—Waters, Schwartz & Nissen

[57] ABSTRACT

Process and equipment for the welding of capillary tubes for biological analyses and other equivalent uses, in which hot plasticizing of glass in limited thicknesses is required. A pair of electrodes for high voltage electric discharge is utilized for the hot plasticization. A small tube is received in a tubular housing which is rotated around its own axis to heat the capillary tube to be welded uniformly.

4 Claims, 4 Drawing Figures

EQUIPMENT FOR WELDING GLASS CAPILLARY TUBES FOR BIOLOGICAL ANALYSES

BACKGROUND OF THE INVENTION

The present invention relates to a process and to equipment for the welding of capillary tubes for biological analyses and other equivalent uses. The arrangement requires hot plasticizing of a restricted glass thickness.

The invention solves the problem of making the welding operation easily, quickly and without waste or difficulties.

SUMMARY OF THE INVENTION

According to the invention, there is substantially provided that the portion to be hot plasticized is arranged in correspondence to an electric arc obtained by discharge between two high potential electrodes.

A laboratory arrangement according to the invention — for the welding of capillary tubes for biological analyses and for other equivalent uses — includes substantially the following: a pair of electrodes for high voltage electric discharge; means to supply the voltage to the electrodes, including a booster transformer, and means to present the piece to be welded and impose thereto suitable motions to obtain regular or smooth welding.

Equipment for the welding of capillary tubes may include a tubular housing to accommodate a capillary tube to be welded, electric motor means with speed reduction for the rotation of the housing, and a time-adjustable switch designed to control the actuation of the motor and simultaneously the supply of the electrodes for the generation of the electric arc. The tubular housing may be aligned with a channel formed in a bracket, along which the tube may be slided or rolled to the channel. Thus, one obtains thereby an easy subsequent insertion of the tube into the tubular housing. The bracket may be provided with an adjustable portion to modify the position of the end edge orthogonal to the channel, so as to match it to the constant length of the tubes of a series of tubes to be welded. The edge may be utilized to define the axial position of the tube in the tubular housing, as by an axial sliding of the tube. The tube end opposite the end to be welded, may be brought in correspondence with the edge, after this has been adjusted in order that the end to be welded be located in correspondence with the electric arc. In order to adjust the outer edge of the bracket, one may utilize a second channel, corresponding to which there is provided a stop designed to define the position of the end to be welded. Once a sample is introduced, one adjusts the movable outer edge until it coincides with the outer end of the tube thus positioned.

The invention will be better understood when following the specification and accompanying drawing, which illustrates an embodiment not restricting the invention. In the drawing:

DESCRIPTION OF THE PREFERRED EMBODIMENT

Figure 1:
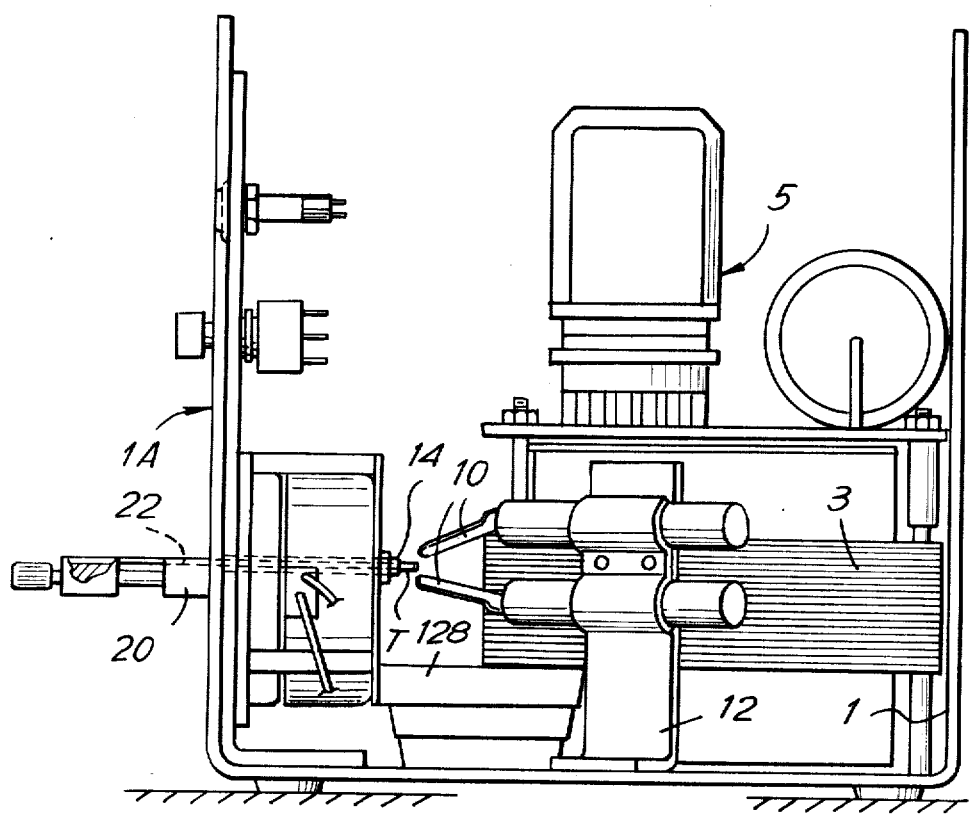
FIG. 1 illustrates a lateral view of equipment according to the invention.

According to the accompanying drawing, 1 denotes an assembly of walls arranged to form the casing of equipment in accordance with the present invention. In the interior of the casing there is a booster transformer 3 and additional electric members, among which a timer switch 5 is inserted in the supply circuit 7 of the primary winding of the transformer 3. On the front 1A there are, among the other control and actuating members, a main switch 9 and a pushbutton switch 5A for the timer 5. On the secondary winding of the booster transformer 3, electrodes 10 are assembled and supported by means of insulating members with a stirrup 12 and arranged in an appropriate position to obtain the discharge of an electric arc therebetween. This electric arc is used to obtain the local fusion of the glass of objects which are to be plasticized. In particular, the electric arc may be advantageously utilized for the welding of an end of the tubes, having a thin capillary wall of glass or the like. The end to be closed by welding of the tube, is presented in the zone of forming of the arc, and the tube is rotated around its own axis to make the welding uniform and smooth.

Figure 3:
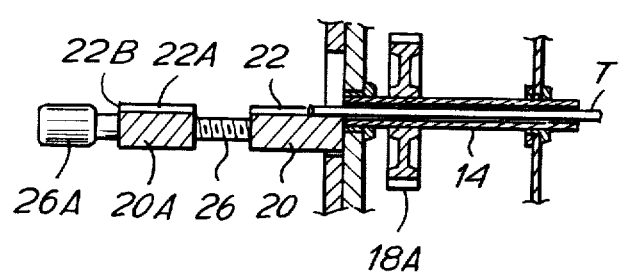
FIG. 3 illustrates a vertical local section taken along the line III—III of FIG. 2.
Figure 2:
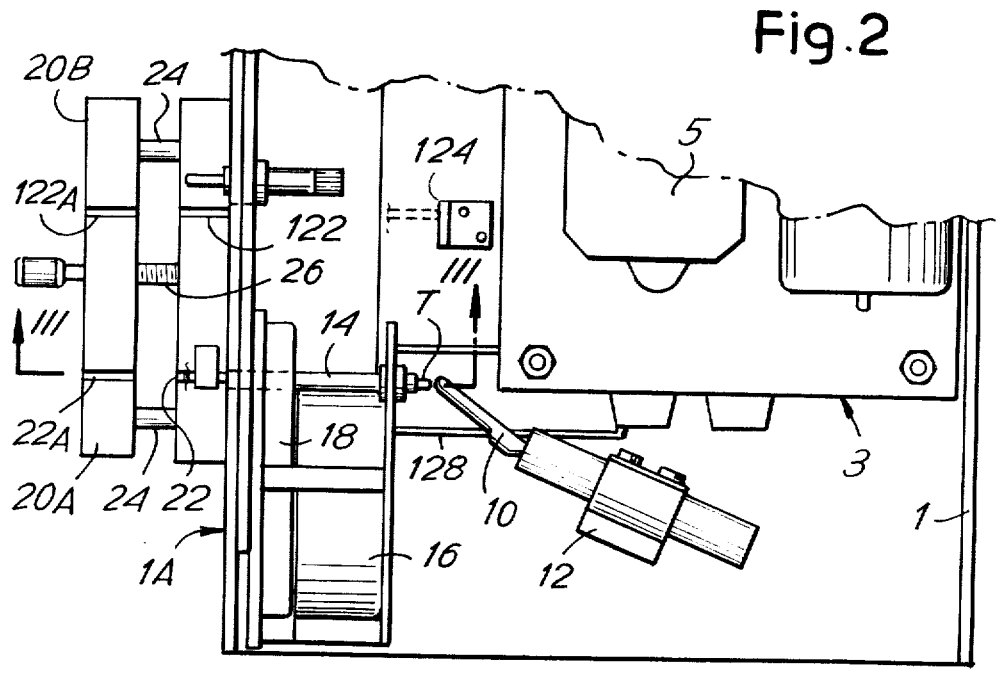
FIG. 2 illustrates a partial plan view.
Figure 4:
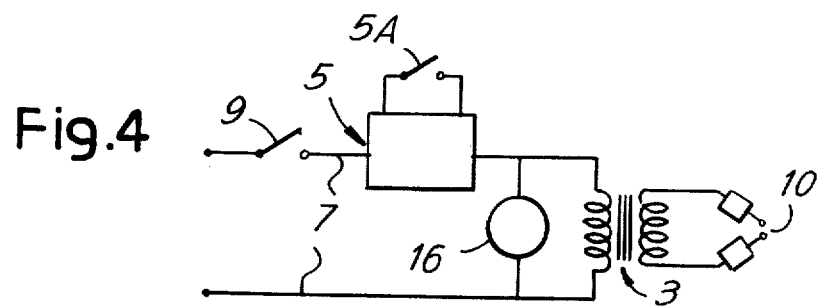
FIG. 4 illustrates a block electric diagram.

In order to obtain this, according to the illustrated embodiment, there is provided a tubular housing formed with a tubular element 14 supported with rotational supports on walls of the casing adjacent the front 1A and orthogonal to this front, so that a tube T inserted in the tubular housing 14 may be positioned with the inner end between the two electrodes 10. The tubular element 14 (forming the housing for the tube T in glass) may be set into rotation by means of an electric motor 16 fed by the circuit 7 controlled by the timer 5. The motor 16 sets the tubular element 14 into rotation through a speed reducer 18 having an output wheel 18A (see FIG. 3) which provides a relatively slow rotational speed of the tube T. The latter may be entrained by the tubular element 14 by the effect of mere contact friction or static friction, or by providing arrangements to obtain higher friction. This may be accomplished, for instance, with a fork spring or the like which presses on the tube T, projecting into the housing 14 from suitable slits made therein. Alternatively, there may also be provided a slight deformation of the housing, to impose a slight forcing contact with the tube T, whose thickness is sufficiently thin so that the tube can be elastically flexible.

For quick positioning of the tube in the housing, a bracket 20 may be provided on the outside of the front 1A, in which an impression 22 is formed orthogonal to the front 1A and arranged in alignment with the tubular element 14 forming the housing for the tube T. In this manner, by sliding or rolling the tube on the bracket 20, one accommodates it in the channel 22, and thereafter by an axial sliding of the same tube, it may be easily inserted in the housing 14 to position it with the end to be welded between the two electrodes 10. In order to speed the positioning operation of the tube end in the correct welding position, when constant length tubes are used, it is possible to adapt the equipment to such lengths of tubes. The equipment has, for this purpose, a bracket 20 which is adjustable in the projection from the front 1A. The bracket 20 has, furthermore, a portion 20A movable in the direction according to the tube development. A channel portion 22A, corresponding to the channel 22, is provided in the portion 20A. The portion 20A is guided by means of sliding columns or studs 24, and may be adjusted by means of a screw 26, operable with a knob and screen 26A. By the appropriate adjustment of the distance A between the front 1A and the outer edge 20B of the bracket, completely formed by the portions 20 and 20A, it is possible to position the end of the tube T to be welded, by sliding the tube T to bring the opposite end thereof in alignment with the edge B. For this purpose, a second channel 122,122A may be provided, with a corresponding hole in the wall 1A. Internally a stop 124 is provided to define the position which corresponds to the one to be imposed to the end to be welded with respect to the electrodes. By introducing a sample tube into the channel 122,122A up to the stop 124, one may adjust the piece 20A in such a manner whereby the edge 20B corresponds to the outer end of the sample tube.

Once the tube is located in the correct position, and the timer 5 is started, (which can be calibrated as a function of the characteristics of the tubes of the lot being worked), the starting of the motor 16 and the start of the discharge arc are determined. The whole interval lasts for a desired time, and is established by the timer 5 to obtain the proper welding of the tube end, with the formation of a symmetrical bead on the axis of the tube T. After the arc ceases and the motor 16 and tubular housing 14 of the tube T stop, the tube may be easily extracted from its housing and replaced.

A tank hopper 128 may be provided to collect and separate pieces of broken tubes and the like.

It is intended that the drawing illustrate only an embodiment giving only a practical demonstration of the invention. The invention may be varied in forms and arrangements without departing from the scope of the concept which forms the invention.

I claim:

1. Laboratory equipment for the welding of capillary tubes comprising, a pair of electrodes for high voltage electric discharge; means to supply voltage to said electrodes, including a booster transformer; means for forming a seat for a piece to be welded; actuating means to impose on said means forming seat suitable motions to obtain smooth welding, said seat forming means including a member forming a tubular housing to accommodate a capillary tube to be welded, said actuating means comprising further an electric motor for the rotation of said housing, and an adjustable timer switch for controlling the actuating of said motor and simultaneously the supply of said electrodes for the generation of said electric arc.

2. Laboratory equipment for the welding of capillary tubes comprising, a pair of electrodes for high voltage electric discharge; means to supply voltage to said electrodes, including a booster transformer; means forming a seat for a piece to be welded; actuating means to impose on said means forming seat suitable motions to obtain smooth welding, said seat forming means including a member forming a housing to accommodate a capillary tube to be welded, said actuating means comprising further an electric motor for the rotation of said housing, and an adjustable timer switch for controlling the actuation of said motor and simultaneously the supply of said electrodes for the generation of said electric arc.

3. Equipment as in claim 1, including a bracket with a channel aligned with said tubular housing, whereby the tube can be slided or rolled to said channel along said bracket, for easy insertion into said tubular housing.

4. Equipment as in claim 3, wherein said bracket has an adjustable portion to modify the position of the end edge orthogonal to the channel, so as to adapt it to the length of the same tubes of a series of tubes to be welded, said edge being utilized to limit the axial position of the tube in the tubular housing.

* * * * *